US005497841A

United States Patent [19]

Cox et al.

[11] Patent Number: 5,497,841

[45] Date of Patent: * Mar. 12, 1996

[54] METHODS FOR CORING A MASONRY WALL

[76] Inventors: Robert D. Cox, 9562 Peppertree Dr., Huntington Beach, Calif. 92646; William Mohlenhoff, 17951 Prado Cir., Villa Park, Calif. 92667

[ * ] Notice: The portion of the term of this patent subsequent to May 14, 2091, has been disclaimed.

[21] Appl. No.: 669,879

[22] Filed: Mar. 14, 1991

[51] Int. Cl.[6] .......... E21B 10/06; E21B 21/14; B23B 17/34

[52] U.S. Cl. .......... 175/11; 52/744; 175/213; 175/333; 408/59; 408/204

[58] Field of Search .......... 52/5.4, 743, 744; 175/71, 212, 213, 215, 404, 333; 408/56, 57, 59, 67, 68, 204, 206

[56] References Cited

U.S. PATENT DOCUMENTS

| | | | |
|---|---|---|---|
| 3,055,443 | 11/1962 | Edwards | 175/333 X |
| 3,102,600 | 9/1963 | Jackson | 175/215 X |
| 3,655,001 | 4/1972 | Hoffman | 175/213 |
| 3,773,121 | 11/1973 | Ikeda | 175/95 |
| 3,946,818 | 3/1976 | Ek | 175/213 X |
| 4,168,755 | 9/1979 | Willis | 175/343 |
| 4,286,899 | 9/1981 | Benichou et al. | 52/744 X |
| 4,512,421 | 4/1985 | Ogahara | 175/71 |
| 4,667,755 | 5/1987 | Muller et al. | 175/330 |
| 4,711,609 | 12/1987 | Seefluth | 408/68 |
| 5,015,128 | 5/1991 | Ross, Jr. et al. | 408/59 |

FOREIGN PATENT DOCUMENTS

| | | |
|---|---|---|
| 1228683 | 4/1960 | France . |
| 1217893 | 6/1960 | France . |
| 642467 | 1/1979 | U.S.S.R. . |
| 713979 | 2/1980 | U.S.S.R. . |
| 912910 | 3/1982 | U.S.S.R. . |

*Primary Examiner*—David J. Bagnell

[57] ABSTRACT

A masonry coring system for drilling vertical holes in a masonry wall comprises a drill bit in the form of a thin-walled cylinder having a cutting end face, a plurality of cutting elements fastened to the cutting end face, and a core breaker located within the interior of the cylinder. The coring system further comprises a driver plate fastened to the drill bit opposite the cutting end face, a driver shaft having a small axial hole therein fastened to the upper surface of the driver plate, a hydraulic motor to rotate the driver shaft, a non-rotating plastic pipe slightly larger than and surrounding the driver shaft, the plastic pipe resting on the driver plate and containing a plurality of holes located at the end near the driver plate. An air compressor forces compressed air through the axial hole in the driver shaft. An evacuation system withdraws the drilling dust through the annulus between the driver shaft and pipe and into a dust collector.

7 Claims, 3 Drawing Sheets

METHODS FOR CORING A MASONRY WALL

BACKGROUND OF THE INVENTION

This invention relates to a technique developed for coring masonry walls or the like, with less optimal, but adequate ability to core concrete and steel. In areas of the country that are susceptible to seismic shock caused by earthquakes it has become necessary to reinforce masonry buildings which, when constructed, were not built to withstand substantial seismic vibration. The method of reinforcement has generally been a technique which involves drilling long vertical holes through the masonry walls, inserting steel reinforcement bars, and grouting the bars in place with resin grout to provide the necessary reinforcement against seismic destruction. Because of the peculiar nature of drilling in an urban environment in what are often historic buildings and the final use of resin in the drill holes, there are several constraints placed upon such techniques.

The first constraint is that the holes which are to be drilled for long distances, which can be up to 100 feet in depth, must be straight so that they do not exit the side of the wall while drilling and further, that they are well-centered for structural optimization. Secondly, since the friction of the drilling process is substantial, an adequate method of cooling the bit is necessary.

The use of water for cooling the drill bit has proven to be unacceptable because the resultant leakage has a tendency to break and wash away mortar between the bricks. Also, the leakage results in an unsightly staining of the face of the masonry wall. Further, the dampness in the wall is a serious problem for the resin grouting formulation. Therefore, dry drilling is necessary not only to eliminate these problems but it is also advantageous because the resin grout can be used immediately. Wet drilling requires that the brick work first be allowed to dry so that the resin grout will cure and bond to the brick. However, dry drilling itself can create the problem of excessive dust. The excessive dust causes a problem of not only settling around the exterior as well as the interior of the building, but collects in the drill hole which plugs the hole and can cause the drill bit to bind up.

Another concern that must be dealt with in the coring of masonry walls is that present core bits which drill a cylindrical hole may leave a core in the hole which must be removed. Present methods for removing such cores have been to cut a series of holes in the face of the masonry wall to extract sections of the core. This technique obviously is undesirable because it requires each hole placed in the face of the masonry wall to be repaired. These repaired holes detract from the beauty of these buildings, many of which have historical and cultural values.

Thus, there exists an urgent need for a masonry coring technique which has the capabilities of drilling long, straight holes, utilizes a dry drilling technique which can control the extraction of the dust, keeps the drill bit cool, and provides for removing the core without having to damage the face of a masonry wall.

SUMMARY OF THE INVENTION

The present invention provides a substantially improved masonry coring technique which eliminates the problems associated with the coring of masonry walls. The system comprises a drill bit, which is simply a tube of steel with carbide and/or diamond teeth mounted at its lower end for cutting a core in the masonry. The steel tube can be from about 3 to 12 inches in diameter. Inside the steel tube is a core breaker which conveniently can be a small version of a rotary cone rock bit which pulverizes the core. The bit and the core breaker are driven by a rotatable steel shaft threaded into a driver plate located at the top of the drill bit. The core breaker and the bit are also threaded onto the driver plate.

The shaft is rotated at a controlled speed by hydraulic motors. Controlled downward force is hand-controlled or may be automated. The bit can be kept in alignment since the shaft is quite stiff and the downward force and rotational speeds are kept low. Compressed air is forced down a small diameter axial hole in the steel shaft and exits through and around the core breaker. Air from inside the core drill flows past the teeth at the bottom and up the annulus between the core drill and the side of the hole being drilled. Air cools the teeth and carries out the ground masonry dust.

The system further includes a plastic pipe which has an interior diameter slightly larger than the steel shaft and is placed around the steel shaft. The plastic pipe does not rotate but simply rides on top of the driver plate. The annulus between the top of the plastic pipe and the hole being drilled is closed with a low-friction collar, or a packing. Air from the annulus around the plastic pipe enters the annulus between the inside of the pipe and the steel shaft through a series of holes located near the bottom of the plastic pipe.

Again, at the top of the hole, the annulus between the plastic pipe and the steel shaft is closed with a packing. This annulus is connected to the suction side of an ejector to draw a suction on the annulus. The ejector output goes into a dust collector.

By combining compressed air through the driver shaft and suction on a small area annulus within the bore hole, sufficient air flow is obtained to keep the cutting teeth of the bit cool and carry dust out of the hole. Material too heavy to be carried out is reground by the bit until small enough to be carried out. It is essential to use suction so that flow rate is enhanced over what could be obtained by air pressure applied to a relatively small diameter hole through the driver shaft.

The suction also is of great assistance in providing dust control. Additionally, it lowers the pressure around the drill bit, and particularly around the plastic pipe. This reduces air leakage through cracks or the like in the wall being drilled. Such cracks are, however, detected by this technique since pressure in the hole near the bit is above atmospheric pressure and puffs of dust can be seen. This detection technique permits sealing before the resin grout is put in the hole. This is important since any resin grout that leaks through a crack detracts from the appearance of the building or causes a clean-up problem.

These and other aspects of the invention will be more fully understood by referring to the following detailed description and the accompanying drawings.

DETAILED DESCRIPTION OF THE DRAWINGS

Figure 1:
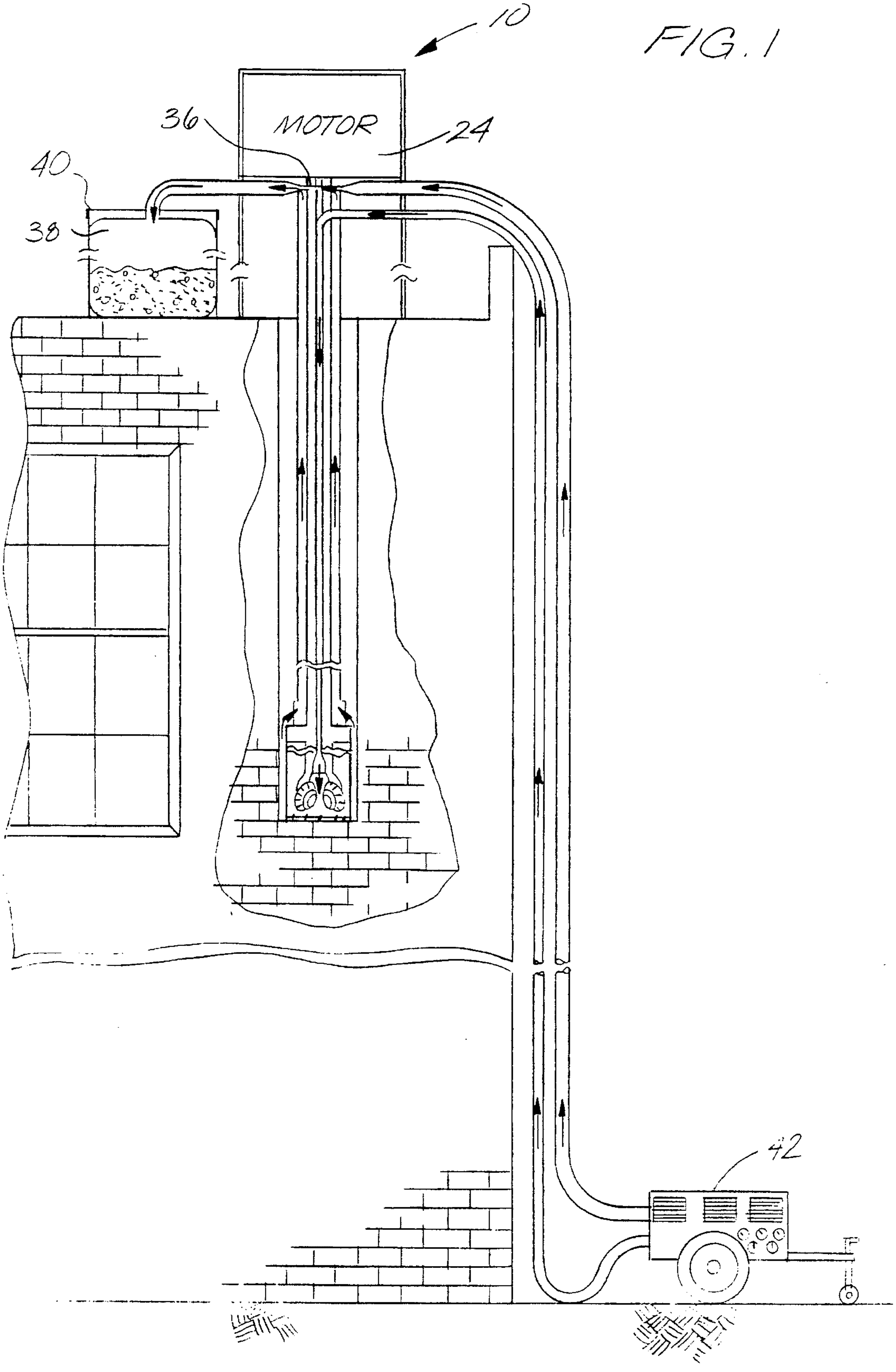
FIG. 1 is a front view of a masonry coring system according to principles of the present invention.
Figure 2:
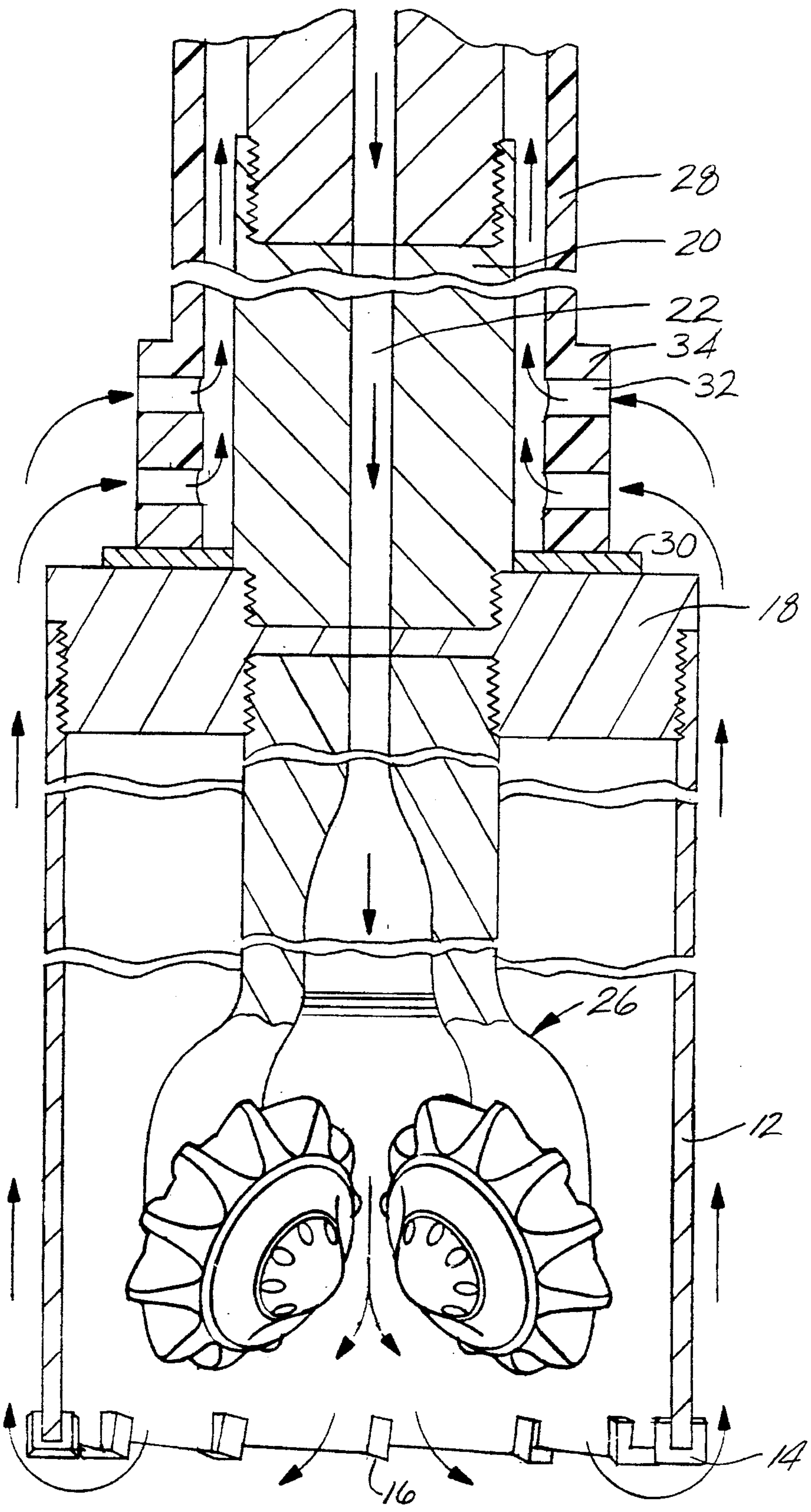
FIG. 2 is a front cross-sectional view of a drill bit of the coring system of FIG. 1.

FIG. 1 is a diagrammatical illustration of a masonry coring system 10 in operation. The coring system is comprised of a drill bit 12, which is a tube of steel with carbide and/or diamond teeth 14 mounted at its lower end for cutting a core in the masonry. Depending upon the particular wall to be drilled, the drill bit can range in size from about 3 to 12 inches in diameter. A four-inch diameter is typical for most wall reinforcements. The steel tube preferably has a ⅜ inch wall thickness. The length of the steel tube is several times the diameter of the tube which enables the drill bit to act as a stabilizer and maintain a straight hole while cutting. As previously mentioned, located along the lower perimeter of the steel tube are a plurality of cemented tungsten carbide and/or diamond teeth. As can be seen in FIG. 2, the teeth are wider than the wall thickness of the steel tube and have a beveled cutting surface 16 which extends beyond the lower surface of the steel tube. The teeth can be mounted on the steel tube at various angles depending upon their intended use. Typically, the teeth are at a rake angle of from 5° to 15°.

The upper end of the steel tube is threaded onto a steel driver plate 18. The threads are standard Acme square thread. Located within the steel tube is the core breaker 26 which is discussed in more detail later.

The drill bit and the core breaker are driven by a rotatable steel driver shaft 20 which is approximately 1⅞ inch in diameter. A driver shaft comes in 4-foot sections with each section weighing approximately 30 lbs. On opposite ends of each driver shaft are a male and a female thread so that the driver shafts can be threaded together as the drill bit works its way down the wall. The initial driver shaft is threaded into the driver plate. As can be seen in FIG. 2, located within the driver shaft is a small diameter axial hole 22, approximately ¼ to ½ inch. The hole exists so that compressed air can be forced through the driver shaft. Another reason for the axial hole being of a small diameter is so that the driver shaft can maintain a thick wall for added weight and rigidity so that it can withstand the torque applied to it and remain straight in the hole.

The shaft is rotated at a controlled variable speed and with controlled downward force by a conventional hydraulic motor 24 of the same type previously used for wet drilling. The drill core is also capable of being maintained true and straight by keeping the downward force and the rotational speeds at a low level. A slow rotational speed is also necessary when using carbide teeth for dust control. A hydraulic motor is an ideal power source for controlling the amount of torque applied to the driver shaft. The actual speeds and downward force used depend on the type of material being drilled (concrete, soft brick, hard-fired brick, etc.) and the depth of the hole. Speeds range from 650 rpm for soft brick down to 350 rpm for hard brick. No additional force is applied to the drill bit beyond the weight of the bit and the drive shaft.

Figure 3:
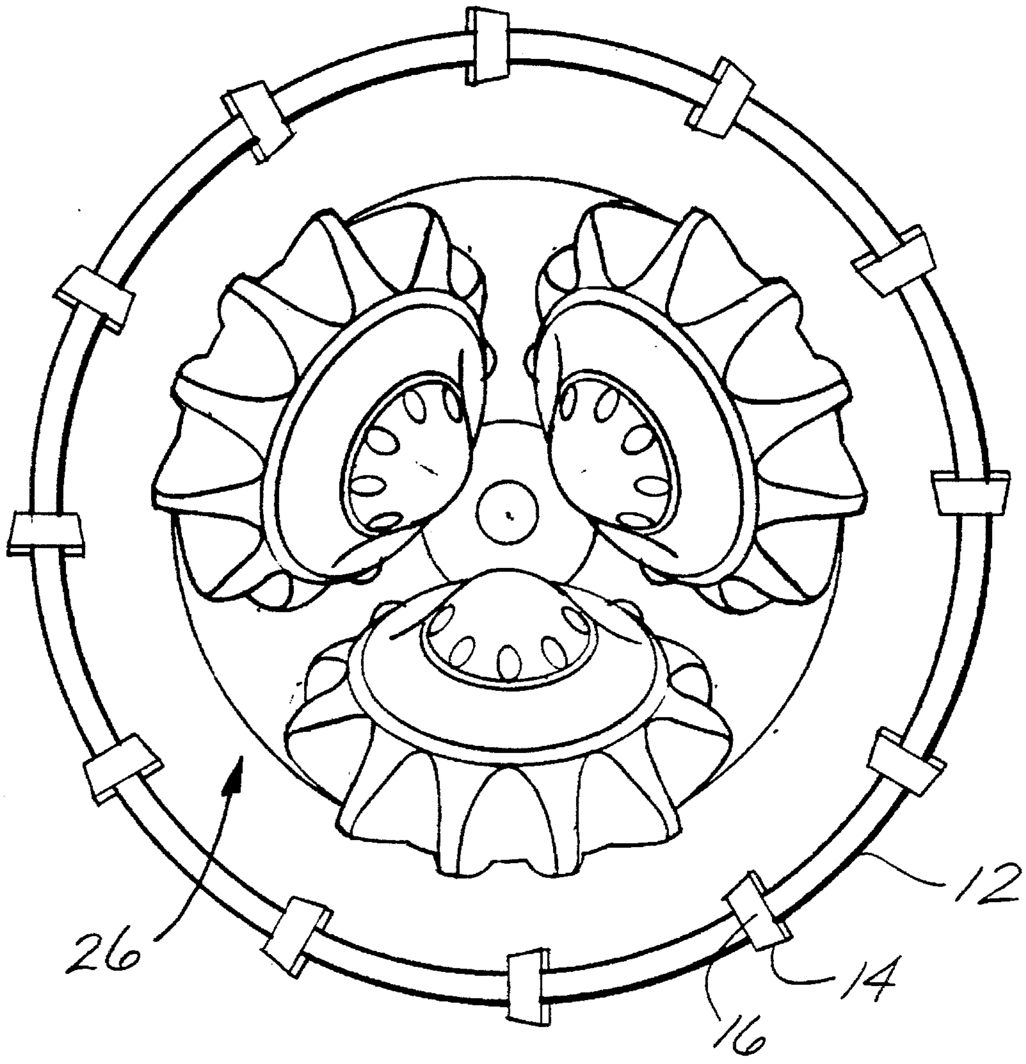
FIG. 3 is a bottom view of the drill bit of FIG. 2.

Referring now to FIGS. 2 and 3, located within the steel tube of the drill bit is a core breaker 26. The upper end of the core breaker is threaded into and driven by the driver plate. The core breaker conveniently may be a small version of a conventional three rotary cone rock bit which pulverizes the core as the bit cuts the hole. Such milled tooth, air cooled rock bits are commonly used for drilling blast holes in mining and quarrying operations.

A plastic pipe 28 with inner diameter just larger than the shaft is placed around the steel driver shaft. This creates approximately a ⅛-inch annulus between the plastic pipe and the driver shaft through which the pulverized masonry is removed. The plastic pipe does not rotate but simply rides on top of the driver plate. However, a Teflon ring 30 is placed between the driver plate and the bottom of the plastic pipe so that the plastic pipe will not be worn down due to the rotating driver plate.

To allow the pulverized core and the drilling dust to be removed through the annulus between the plastic pipe and the driver shaft there are a series of holes 32 approximately ⅝-inch in diameter located at the lower end of the plastic pipe and near the driver plate. A coupling 34 with similarly located holes is placed over the end of the plastic pipe for added structural integrity. The plastic pipe is preferably made of a schedule 80 PVC.

At the top of the wall, the annulus between the plastic pipe and the steel shaft is closed with a packing. This annulus is connected to the suction side of a Venturi ejector 36 to draw a suction on the annulus. The pulverized core and the drilling dust is drawn through the annulus by the ejector and into a dust collector 38 which normally is a bag located within a 55 gallon drum 40. Also located at the top of the hole is an air compressor 42 used to force compressed air through the small axial hole in the drive shaft as well as operate the ejector.

In operation, the hydraulic motor rotates the drive shaft which, in turn, rotates the driver plate and the drill bit. The carbide and/or diamond teeth cut a cylindrical hole through the brick. The core thus created by the drill bit is pulverized by the three rotary cone rock bit.

Compressed air is forced down the small axial hole in the steel drive shaft and exits through and around the core breaker. Air from inside the core drill flows past the teeth at the bottom of the drill bit and up the annulus between the core drill and the side of the hole being drilled. This air cools the teeth and carries out the ground masonry. The amount of compressed air that is forced down the hole in the drive shaft must be sufficient to carry out the ground masonry but not too excessive such that it would dislodge the mortar between the bricks. Applicant has found that between 90 and 105 psi of air pressure at the top of the wall is sufficient for drilling about the first 40 feet, and then the pressure is slightly increased beyond that level.

The annulus between the top of the plastic pipe and the hole being drilled is closed with a packing. The compressed air that has now exited around the drill bit and into the annulus between the drill bit and the hole being drilled then enters into the annulus between the plastic pipe and the drive shaft through the series of holes near the bottom of the plastic pipe. Again, at the top of the hole, the annulus between the plastic pipe and the steel drive shaft is sealed with a packing. This annulus is connected to the Venturi ejector which draws the dust laden air out of the hole through the annulus and into the dust collector. By combining compressed air through the driver shaft and suction on a small area annulus of the bore hole, sufficient air flow is obtained for keeping the cutting teeth of the drill bit cool as well as sufficient air flow for carrying the dust out of the hole. Pieces of the pulverized core which are too heavy to be carried out by this air flow, are reground by the bit until small enough to be carried out.

It is necessary to use suction so that the air flow rate is enhanced over that obtainable by air pressure alone applied to the relatively small diameter hole through the drive shaft. Furthermore, the suction is of great assistance in providing dust control. It also lowers the pressure around the drill bit and particularly around the plastic pipe. This reduces air leakage through cracks or the like in the wall being drilled.

Such cracks are, however, detected by this technique since pressure in the hole near the bit is above atmospheric pressure and puffs of dust can be seen through any existing cracks. This detection technique is important because it permits the sealing of these cracks before resin is put in the hole.

Once the hole has been completely drilled, the drill string is removed from the hole. A steel reinforcement rod is placed in the hole and resin grout is used to fill the hole to provide the wall with the necessary reinforcement against seismic destruction.

Although the present invention has been described and illustrated with respect to a preferred embodiment thereof, it is to be understood that it is not to be so limited, since changes and modifications may be made therein which are within the full intended scope of this invention as hereinafter claimed.

What is claimed is:

1. A method for reinforcing a masonry wall against seismic destruction, comprising the steps of:

rotating a drill bit on a driver shaft and drilling a hole in the masonry wall, producing drilling dust;

surrounding the driver shaft with a pipe to provide an annulus between the driver shaft and the pipe;

forcing compressed air through the driver shaft and drill bit;

suctioning the drilling dust through the annulus;

collecting the drilling dust;

placing a reinforcement bar in the hole; and filling the hole with resin grout.

2. A method of reinforcing a masonry wall of claim 1, wherein the step of suctioning the drilling dust through the annulus between the driver shaft and the pipe surrounding the driver shaft is performed by a venturi ejector.

3. A method for reinforcing a structure, comprising the steps of:

cutting a hole in the structure and pulverizing the cut away structural material to form drilling dust with rotating drilling means;

simultaneously forcing air into the drilling means to cool the drilling means and to draw the drilling dust into a stream of air, withdrawing the dust laden stream from the hole;

collecting the drilling dust;

placing a reinforcement bar in the hole; and filling the hole with a bonding material.

4. A method for reinforcing a structure, comprising the steps of:

cutting a hole in the structure and pulverizing the cut away structural material to form drilling dust with drilling means;

simultaneously forcing air into the hole to draw the drilling dust into a stream of air and withdrawing the dust laden stream from the hole;

collecting the drilling dust;

placing reinforcement in the hole; and filling the hole with a bonding material.

5. The method of claim 4 where the drilling means is surrounded by pipe means with a gap between the pipe means and the drilling means, and the air stream is directed to flow upward in said gap through said pipe.

6. The method of claim 5 where the structure is a wall and the hole is drilled into the top of the wall.

7. The method of claim 6 where the drilling means includes a conduit and the air is forced downward through the conduit, and then into said gap.

* * * * *